(12) United States Patent
Fosbinder

(10) Patent No.: US 7,858,904 B2
(45) Date of Patent: Dec. 28, 2010

(54) SYSTEM AND METHOD OF CONTROLLING AUXILIARY/WELD POWER OUTPUTS OF A WELDING-TYPE APPARATUS

(75) Inventor: Daniel C. Fosbinder, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1450 days.

(21) Appl. No.: 10/905,792

(22) Filed: Jan. 20, 2005

(65) Prior Publication Data

US 2006/0157459 A1 Jul. 20, 2006

(51) Int. Cl.
*B23K 9/10* (2006.01)
(52) U.S. Cl. .................. 219/133; 219/130.1; 219/137 R
(58) Field of Classification Search .................. 216/133; 290/1 R; 219/133, 134, 130.21
See application file for complete search history.

(56) References Cited

U.S. PATENT DOCUMENTS

| | | | |
|---|---|---|---|
| 3,513,325 A | 5/1970 | Tharp | |
| 3,597,623 A | 8/1971 | Gilardi | |
| 3,889,178 A | 6/1975 | Jackson | |
| 4,730,516 A | 3/1988 | Kaneyuki | |
| 5,376,877 A | 12/1994 | Kern et al. | |
| 5,444,214 A * | 8/1995 | Crouse et al. | 219/133 |
| 5,504,417 A | 4/1996 | Kern et al. | |
| 5,549,524 A | 8/1996 | Yang | |
| 5,635,768 A | 6/1997 | Birch et al. | |
| 5,814,788 A * | 9/1998 | Everhart et al. | 219/133 |
| 5,825,642 A | 10/1998 | Ishii et al. | |
| 5,861,604 A | 1/1999 | McLean et al. | |
| 5,968,385 A | 10/1999 | Beeson et al. | |
| 6,111,217 A | 8/2000 | Beeson et al. | |
| 6,121,691 A | 9/2000 | Renner | |
| 6,153,855 A | 11/2000 | Renner et al. | |
| 6,281,613 B1 | 8/2001 | Nakamura et al. | |
| 6,310,321 B1 | 10/2001 | Beeson et al. | |
| 6,469,276 B1 | 10/2002 | Renner et al. | |
| 6,469,401 B2 | 10/2002 | Beeson et al. | |
| 6,479,794 B1 * | 11/2002 | Sykes et al. | 219/133 |
| 6,603,213 B1 | 8/2003 | Renner | |

* cited by examiner

*Primary Examiner*—Stephen J Ralis
(74) *Attorney, Agent, or Firm*—Fletcher Yoder

(57) ABSTRACT

A system and method of controlling available power of an auxiliary output of a welding-type power source is disclosed. The welding-type power source is configured to supply power to a variable combination of a welding-type output and the auxiliary output and includes a controller configured to detect a load on the auxiliary output. The controller is configured to monitor an engine operating parameter of the welding-type power source and to limit the amount of power provided to the auxiliary output to an amount of power capable of being generated by the engine at a current engine condition.

15 Claims, 4 Drawing Sheets

SYSTEM AND METHOD OF CONTROLLING AUXILIARY/WELD POWER OUTPUTS OF A WELDING-TYPE APPARATUS

BACKGROUND OF THE INVENTION

The present invention relates generally to a welding-type apparatus and, more particularly, to controlling an auxiliary power output of an engine driven welding-type apparatus according to engine operational parameters.

Engine driven welding-type apparatus and welding-type power supplies typically include a generator powered by the engine and configured to generate both welding-type power and auxiliary power. Direct current (DC) generators or alternating current (AC) generators are available depending upon a desired application. In either case, the welding-type apparatus generally includes output rectifiers to provide a relatively precise DC output power or filtering devices to provide relatively consistent AC output power to a welding-type output of the welding-type apparatus. Accordingly, relatively precisely controlled and accurate power is delivered to the welding-type output to effectuate a desired welding-type process.

Many generator-driven welding-type power supplies include an auxiliary output in addition to the welding-type output. As such, the welding-type apparatus is often configured to provide a 110 Volt (V) AC, 240 VAC, or 480 VAC, single or three phase, auxiliary power to the auxiliary output. Understandably, other power signals can be provided depending on the requirements of a particular device intended to be powered by the auxiliary power output. The auxiliary output is typically designed to provide power to additional worksite equipment such as hand power tools, lights, and the like. These devices, which are generally designed to be powered from transmission power receptacles, require a voltage supply that is generally constant regardless of current draw. Additionally, the power signal provided at these auxiliary outputs is, in part, dependent on engine operational parameters. That is, when an engine configured to power an auxiliary outlet is operated at an idle speed, the power signal provided to the auxiliary output is lower than the power signal provided to the same auxiliary outlet when the engine is operated at a speed above idle. If the auxiliary outlet has a load placed upon it when the engine is running at a speed below the speed required to generate the desired output, the draw at the auxiliary outlet can detrimentally effect engine operation and may damage the load if proper voltage and frequency are not attained.

Other engine driven generator apparatus have resolved this problem by not supplying any power to the auxiliary outlets unless the engine is operated at full speed. Although this solution resolves the condition of "overloading" the engine at idle speeds, it is inefficient in overall usage of the total power generated by the welding-type power source. That is, in many welding-type power source systems, when the engine is operated at full speed, it is capable of providing adequate power output to both the welding-type output and the auxiliary outputs of the apparatus. As such, running the engine at full speed consumes more fuel, generates more engine noise, and increases wear on the engine as compared to running the engine at a lower speed that is adequate to generate the desired electrical output.

Other welding-type power sources control the amount of power available at the auxiliary output based on a worst case engine output to ensure a load can be picked up from idle. That is, these systems do not utilize the entire range of power capable of being generated by an engine of the apparatus.

During operation of the engine, a torque is generated that rotates the rotor of the generator relative to the stator thereby generating electrical power. The engine is capable of generating a peak horsepower which, generally speaking, is not coincident with a peak torque generated by the engine. This relationship often results in a particular generator being associated with a specific engine such that the engine operates at the horsepower rating coinciding with the peak torque value during maximum generator output. This association underutilizes the engine in that the engine is operated below the engine's peak horsepower. As such, the maximum power achievable by the engine of the power source is not utilized during standard operation of the engine driven generator apparatus.

Operation of engine driven welding-type apparatus can be shown by a power versus torque or power versus engine speed curve 2, as illustrated in FIG. 1. That is, as the engine speed or related torque of the engine increases, total power delivery including power delivery to an auxiliary output also increases. The increase in the power generated by the engine/generator combination increases until a threshold commonly referred to as power-torque knee 4 is reached. That is, when engine speed increases past the power-torque knee 4, torque decreases while horsepower continues to increase. Known welding type devices limit the operation of the engine driven generator assembly to points of operation approximately to the power-torque knee at full engine speed. Such a construction prevents the engine of such systems from operating at a maximum horsepower of the engine. Accordingly, a more robust engine is required to be associated with a corresponding generator. As such, the association, or rating, of a generator to an engine increases the size of the engine required to power a particular generator. The rating of the generator and engine increases the size and mass of the resulting combination and inefficiently utilizes the range of power cable of being generated by the engine.

It would therefore be desirable to have a system and method capable of controlling an auxiliary output of an engine driven welding-type apparatus based on operational parameters of the engine.

BRIEF DESCRIPTION OF THE INVENTION

The present invention provides a system and method of controlling the systems of an engine driven welding-type apparatus that overcomes the aforementioned drawbacks. Specifically, the auxiliary output of the engine driven welding-type apparatus is controlled based on a power output achievable by the engine.

In accordance with one aspect of the present invention, a welding-type power source controller is disclosed that is configured to detect a load on an auxiliary output of a welding-type power source which is configured to supply power to a variable combination of a welding-type output and the auxiliary output. The controller is further configured to monitor an engine operating parameter of the welding-type power source and regulate a power provided to the auxiliary output. The power of the auxiliary output is regulated to an amount of power capable of being generated by the welding-type power source at a current engine condition or reduced power until the engine achieves a desired engine operating parameter as determined by the load detected.

In accordance with another aspect of the present invention, a welding-type power source is disclosed that has an engine driven generator configured to selectively deliver power to a welding-type output and an auxiliary output. The welding-type power source includes an engine speed sensor configured to monitor an engine speed of the engine driven generator and a controller. The controller is configured to receive feedback from the engine speed sensor and adjust power delivered to the auxiliary output in response to engine speed.

In accordance with yet another aspect of the present invention, a method of controlling a welding-type apparatus is disclosed that includes: sensing an auxiliary load present at an auxiliary output of an engine-driven power source configured to supply power to at least one of a welding-type output and the auxiliary output, sensing a power parameter of the engine-driven power source, comparing the auxiliary load and the power parameter of the engine-driven power source, and adjusting power delivered to the auxiliary output based on the comparison of the auxiliary load and the power parameter of the engine.

In accordance with another aspect of the present invention, a welding-type power source is disclosed that includes means for powering an auxiliary output of a welding-type power source and means for monitoring an engine speed of the welding-type power source. The welding-type power source includes means for controlling the auxiliary output powering means in response to the engine speed monitoring means to maintain the engine speed at a speed required to generate the adequate auxiliary output.

Various other features, objects, and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention is directed to a system and method for controlling an auxiliary output based, in part, on operation of an engine of an engine driven welding-type apparatus. A controller is configured to control the auxiliary output to allow the engine to operate at an engine speed required to deliver a desired power to the auxiliary output. If the actual engine speed is insufficient to support a desired load, the power supplied to the auxiliary output is adjusted to allow the engine speed to adjust to accommodate the desired load.

As one skilled in the art will fully appreciate, the herein description of welding apparatus not only includes welders, but also includes any system that requires high power outputs in conjunction with auxiliary outputs, such as heating and cutting systems. Therefore, the present invention is equivalently applicable with welders, plasma cutters, induction heaters, aircraft ground power units, and the like. Reference to welding power, welding-type power, or welders generally, includes welding, cutting, heating power, or ground power for aircraft. Description of a welding apparatus illustrates just one embodiment in which the present invention may be implemented. The present invention is equivalently applicable with many high power systems, such as cutting and induction heating systems, aircraft ground power systems, and any similar systems.

Figure 1:
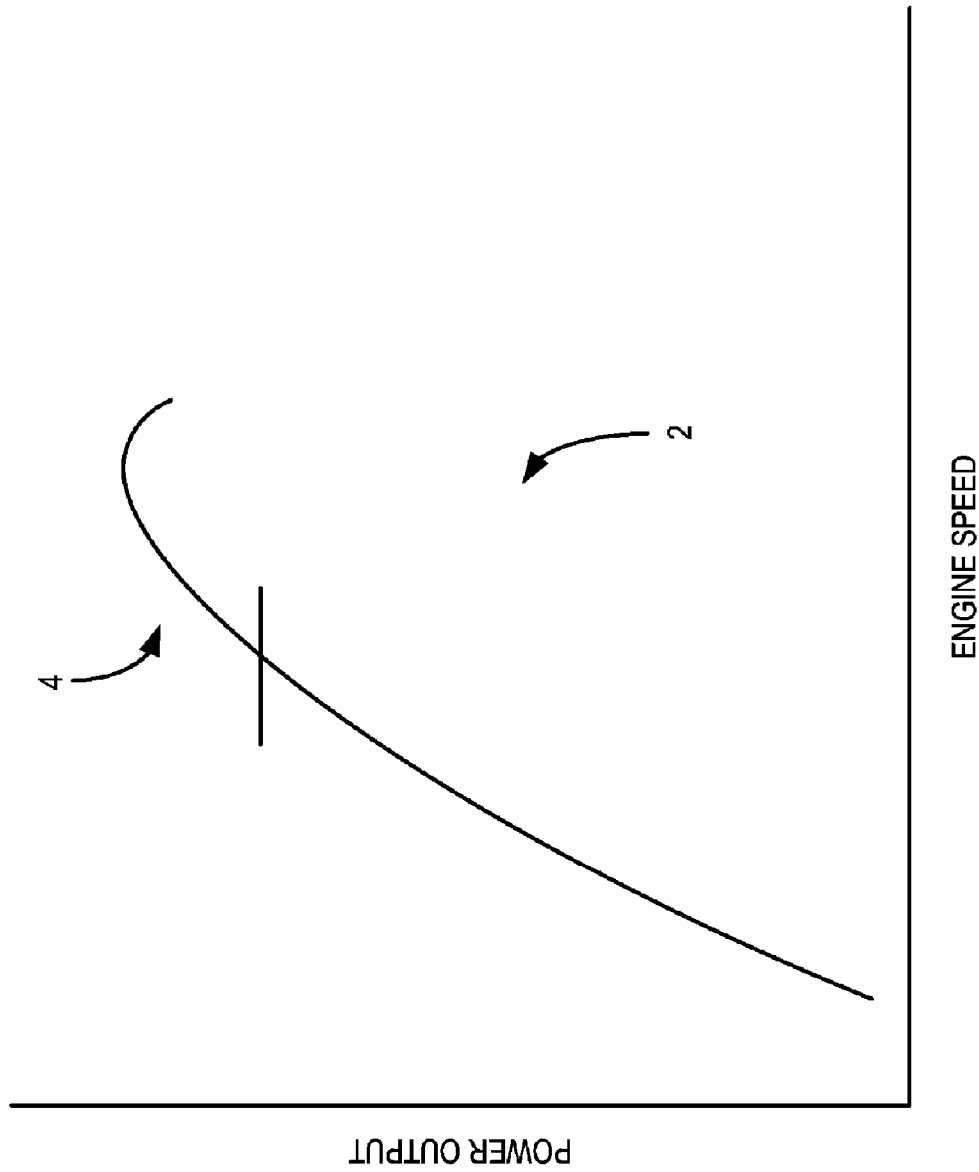
FIG. 1 is a graph of a power torque output versus engine speed indicative of an exemplary engine for use with engine driven welding-type apparatus.
Figure 2:
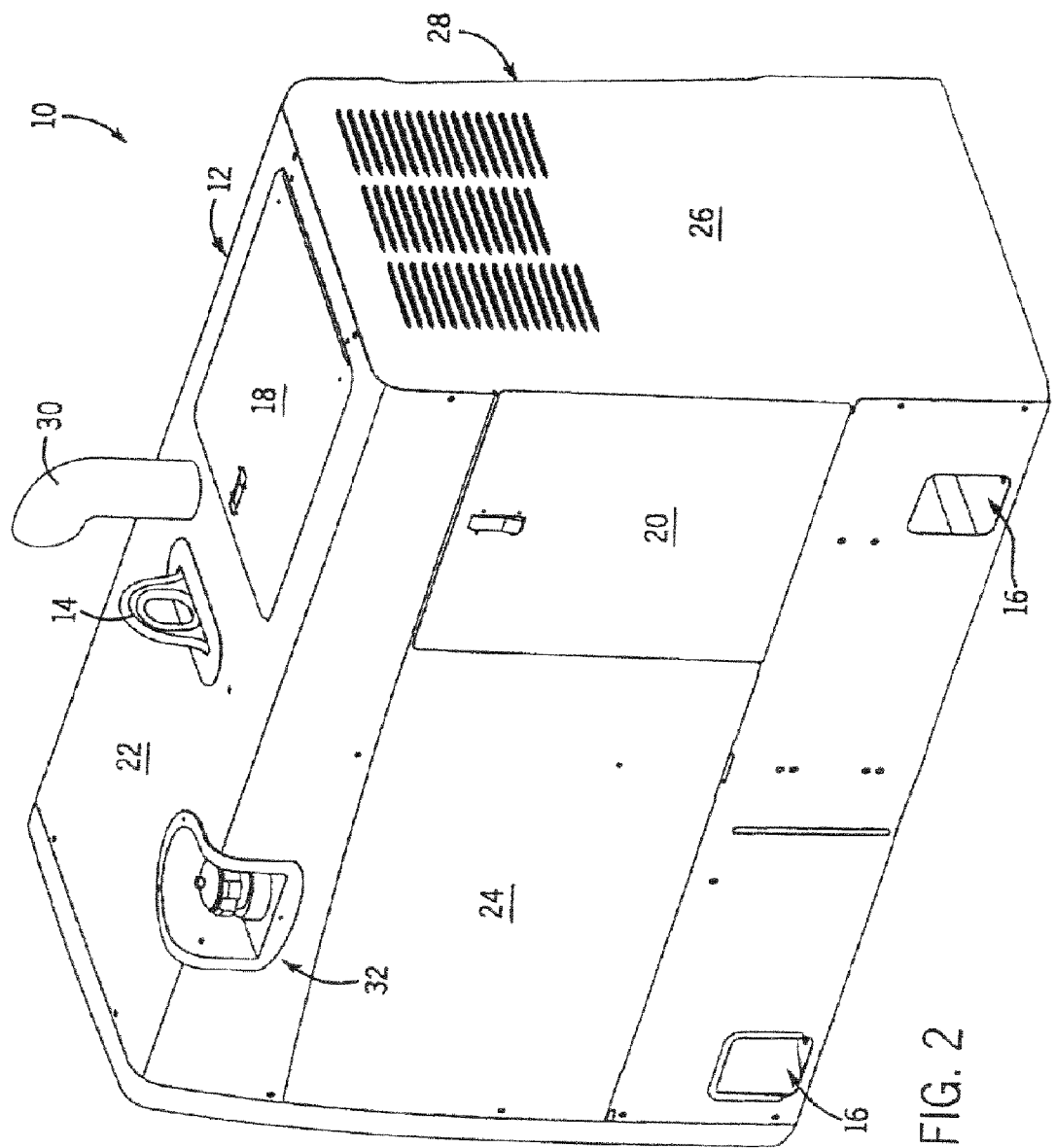
FIG. 2 is a perspective view of an engine driven welding-type apparatus for use with the present invention.

FIG. 2 shows a welding-type device 10. The welding-type device 10 includes a housing 12 which encloses its internal components. Optionally, the welding-type device includes a loading eyehook 14 and/or fork recesses 16. The loading eyehook 14 and the fork recesses 16 facilitate the portability of the welding-type device 10. Optionally, the welding-type device 10 could include a handle and/or wheels as a means of device mobility. The housing 12 also includes a plurality of access panels 18, 20. Access panel 18 is hinged to side panel 24 while access panel 20 is, in one embodiment, hinged to top panel 22. A similar access panel is available on an opposite side of the welding-type device 10. These access panels 18, 20, provide access to the internal components of the welding-type device. An end panel 26 includes a louvered opening 28 to allow for air flow through the housing 12.

The housing 12 of the welding-type device 10 also houses an internal combustion engine. In this regard, an exhaust port 30 extends through top panel 22 and a fuel port 32 extends through an intersection of top panel 22 and side panel 24. The exhaust port 30 extends above the top panel 22 of the housing 12 and directs exhaust emissions away from the welding-type device 10. The fuel port 32 preferably does not extend beyond the top panel 22 or side panel 24. Such a construction protects the fuel port 32 from damage during transportation and operation of the welding-type device 10.

Figure 3:
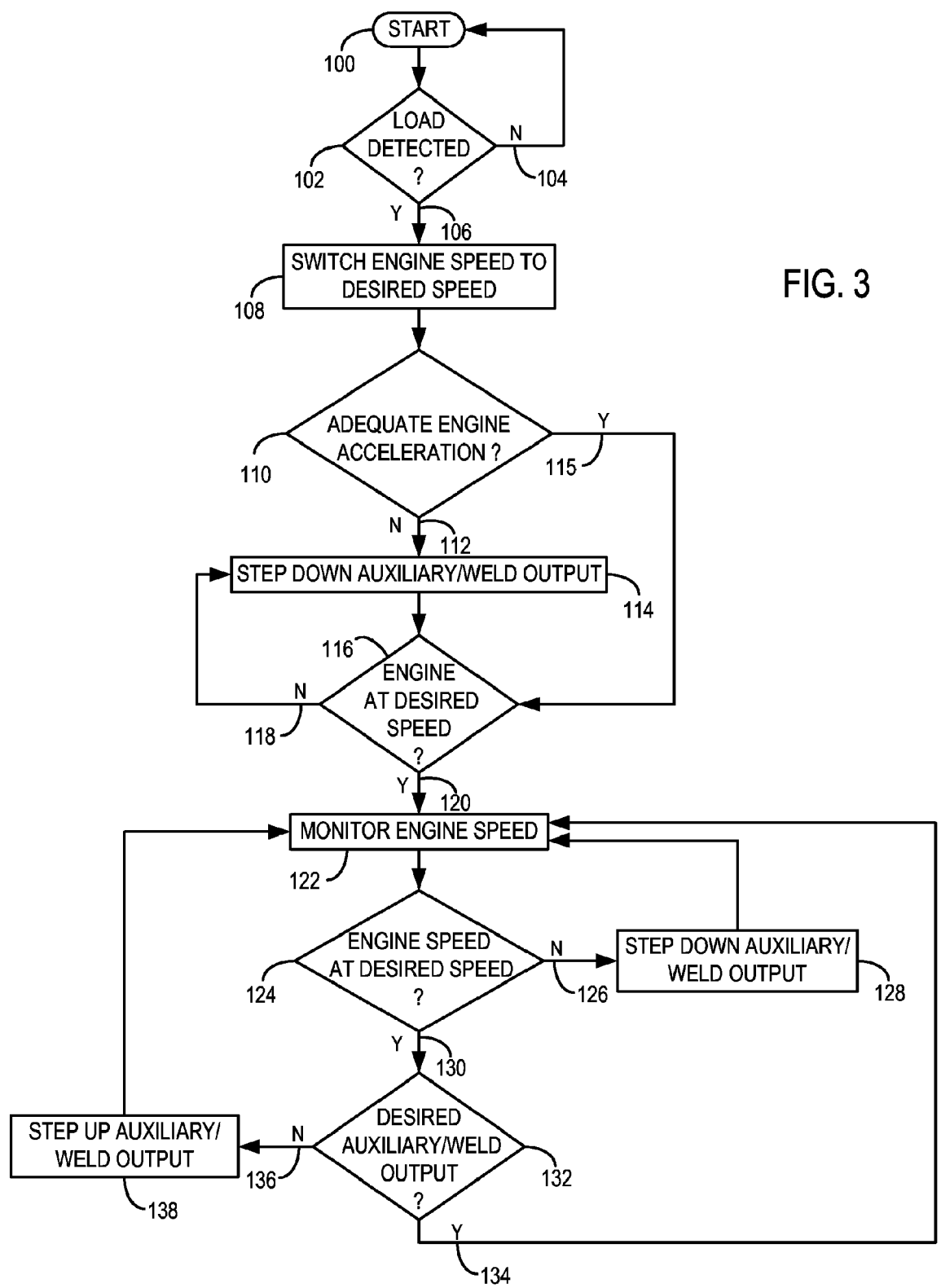
FIG. 3 is a flow chart setting forth the steps of a technique for controlling an engine based on a power requirement of an auxiliary output in accordance with the present invention.

Referring now to FIG. 3, a flow chart setting forth the steps of a control technique in accordance with the present invention is shown. The technique starts 100 by detecting whether a load is present at the auxiliary output 102. Additionally, the technique could also detect whether a load is present at the welding power output and control operation of the system based on at least one of the load detected at the auxiliary output, the welding power output, or a combination thereof. If no load is detected 104, the technique is restarted 100 and reloops 102-104 until a load is detected. However, if a load is deemed present at the auxiliary/weld output 106, the engine speed of the welding-type apparatus is switched to a desired engine speed 108. Understandably, desired engine speed 108 could be full engine speed or an engine speed sufficient to support auxiliary output load 102. Once the engine speed is switched to the desired engine speed 108, the welding-type apparatus engine speed increases and is monitored to determine whether the engine is accelerating adequately 110. For example, it is contemplated that the initial engine speed may be an idle speed and the desired engine speed may be a higher, non-idle or "high" engine speed.

If the engine is not accelerating at a rate sufficient to maintain the auxiliary output load 112, the power delivered to the auxiliary/weld output is stepped down 114. Alternatively, it is understood that the auxiliary output load could be maintained a present supportable output or, minimally, prevented from increasing. Assuming that the auxiliary load is reduced, in the example of a transition from an idle speed to a desired higher or "high" speed, the decrease in auxiliary load allows the engine to accelerate and avoid engine overload while still maintaining a responsive, undelayed, increase in engine speed. It is contemplated, that this step down 114 of the auxiliary/weld output may be by predetermined, incremental, or may be by a dynamically adjusted slope down calculated in real time and responsive to the determination of whether engine speed is adequately adjusting 110 to changing operating demands. Alternatively, as will be discussed further below with respect to FIG. 4, welding-type device 10 may be equipped with a control that includes an auxiliary output/engine parameter map. That is, auxiliary load 110, once sensed, will not be supplied until an engine parameter is within a range for a particular auxiliary load. Understandably, the engine parameters can include, and are not limited to, horse-power, engine speed, torque, throttle setting, or any other measurable or determinable engine parameter.

In either case, whether engine speed is increasing fast enough to maintain load 115 or whether the output to the auxiliary/weld output has been stepped down or merely maintained 114, a check is made to determine whether the engine speed of the welding-type apparatus has yet reached the desired engine speed 116. If in either case 114, 115, the engine speed has not yet reached the desired speed 118, power supplied to the auxiliary/weld output is stepped down 114. However, if the engine speed has reached the desired speed 120, the technique enters another monitoring phase with continued monitoring of engine speed 122.

From the monitored engine speed 122, a check is made to again determine whether the engine speed is at the desired speed 124. If the engine speed has dropped below the desired engine speed 126, the power delivered to the auxiliary/weld output is stepped down 128 and engine speed monitoring is reiterated 122. As such, the power delivered to the auxiliary output is adjusted to allow the engine to maintain a desired and natural operational speed regardless of the amount of demand placed on the auxiliary output. Additionally, such a construction allows the engine to operate at the engines peak horsepower when a peak torque is not required. Accordingly, an entire range of the engines achievable horsepower is utilized to maximize the efficiency of welding-type device 10. If the engine speed is at the desired engine speed 130, a check is made to determine whether the actual power output delivered to the auxiliary/weld output is comparable to the power desired at the auxiliary/weld output 132. If the power output at the auxiliary/weld output is at the desired power 134, then engine speed is sufficient to meet the auxiliary output power requirements and engine speed monitoring reiterates 122.

However, if the power output to the auxiliary/weld output is not at the desired output 136, the power to be delivered to the auxiliary/weld output is then stepped up 138 such that additional power is delivered to the auxiliary/weld output. Again, it is contemplated that this step up may be a predetermined incremental step up, may be dynamically selected and adjusted according to real-time operational parameters, or may be associated with an operational parameter of the engine. In either case, after the increase in the auxiliary/weld output, engine speed is again monitored 122 to determine whether engine speed and auxiliary/weld output are as desired. Specifically, this monitoring of the engine speed continues such that dynamic adjustments to the auxiliary/weld output can be made in real-time or near real-time based on engine operational parameters. This allows the engine of the welding-type device to operate approximately at a peak horsepower condition while assuring that the engine has an opportunity to respond to changes in the auxiliary/weld load without detrimentally effecting engine operation. That is, when auxiliary/weld load is demanded from the device, the auxiliary/weld load is not provided until it has been confirmed that the engine operating condition can support the requested auxiliary load. Such a construction prevents an engine overload condition across the operational range of the engine and allows the engine to accelerate and decelerate at the engine's natural frequency.

It should be recognized that this technique is designed such that prior knowledge of the power-torque curve of a particular engine is not necessary. That is, the technique is responsive in real-time or near real-time to the responsiveness of the engine and corresponding power outputs. Therefore, no prior knowledge or historical data regarding a particular engine/generator combination power-torque curve is necessary. Rather, in one embodiment, the system responsively reacts to provide maximum power while avoiding detrimental engine operating conditions. Alternatively, should the control be implemented with known constituent components, it is equally understood to provide an engine-condition/auxiliary-load map for determination of the welding-type devices engine/auxiliary output operating condition.

Figure 4:
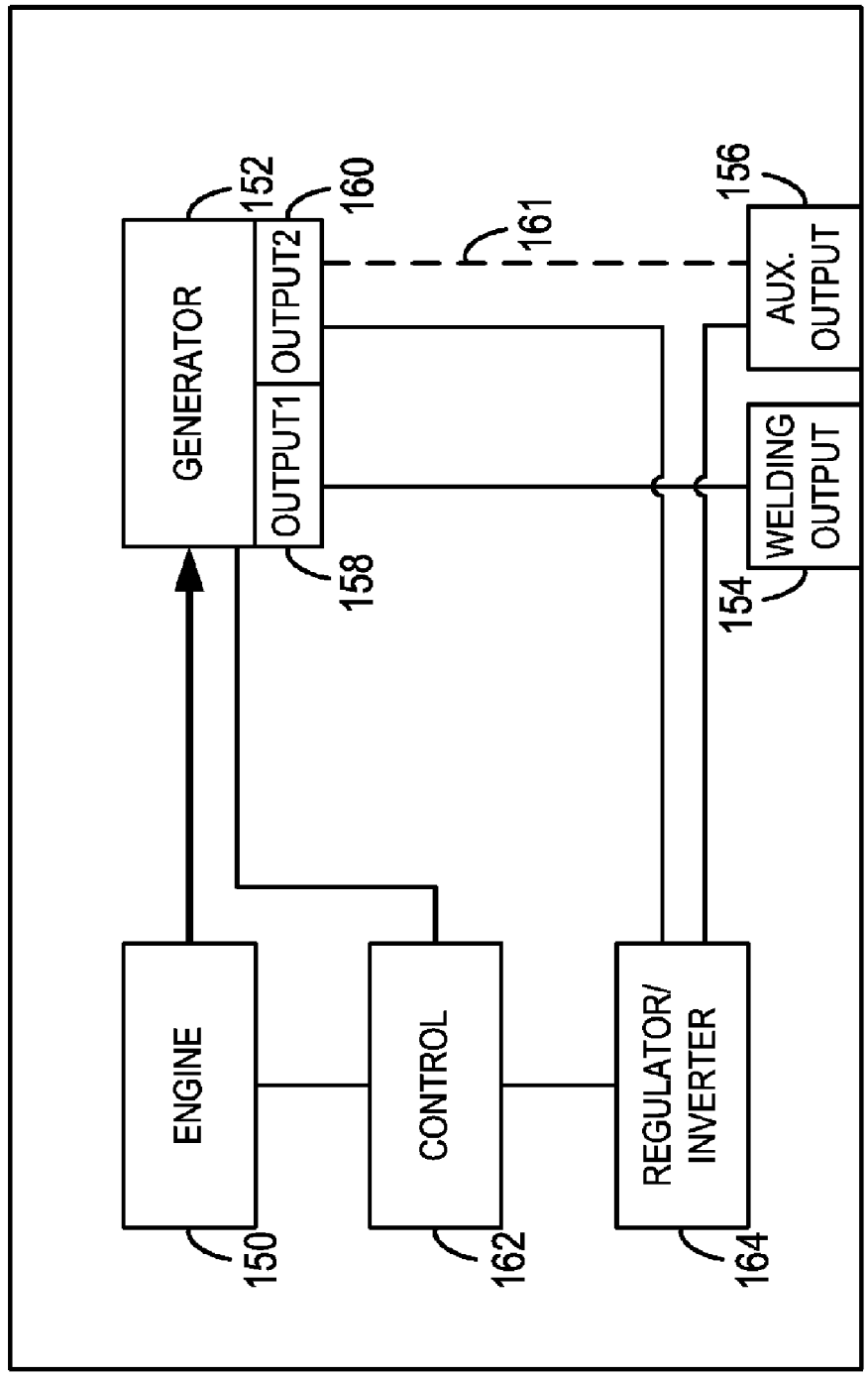
FIG. 4 is a block diagram of the components of the engine driven welding-type apparatus shown in FIG. 2.

FIG. 4 shows a diagram of the components of welding-type device 10. Welding-type device 10 includes an internal combustion engine 150 mechanically coupled to a generator 152. Generator 152 is connected to weld power output 154 and auxiliary output 156. It is understood that generator 152 could be segregated into a first output 158 and a second output 160 wherein first output 158 supplies power to weld power output 154 and a second output 160 supplies power to auxiliary output 156. Alternatively, it is understood that generator 152 could be provided in two separate and distinct generators wherein each respective generator powers one of the welding-type output and the auxiliary output. It is also understood that second output 160 could be connected directly to auxiliary output 156, indicated by dashed line 161, and regulated by controller 162 to provide a desired auxiliary output signal.

A controller 162 is connected to engine 150 and monitors one or more engine power parameters such as engine speed or RPM, throttle position, engine torque, or the like. Controller 162 is also connected to generator 152 and monitors the power demand, such as the output voltage, of auxiliary output 156. It is understood that controller 162 can be configured to also monitor and regulate the power signal provided at first output 158 to welding output 154. The power demands of auxiliary output 156 can be calculated from any of current, resistance, voltage drop, or the like experienced by welding-type device 10 at auxiliary output 156. Power delivered to auxiliary output 156 is regulated by a regulator/inverter type device 164 that is in communication with or controlled by controller 162. It is understood that device 164 can be a regulator, an inverter, or a combination thereof, depending on the type of power signal provided thereto or the output desired therefrom.

Upon demanding a desired load at auxiliary output 156, controller 162 determines if the current engine condition can support, or bring up, the requested auxiliary load. If the engine is operating at a power condition sufficient to support the demanded load, regulator/inverter 164 regulates generator 152 to provide the full desired output voltage to auxiliary output 156. If the engine is operating at a condition that is insufficient to support the demanded auxiliary load, controller 162 controls the regulator/inverter 164 and/or generator 152 to limit the amount of auxiliary power provided to auxiliary output 156 to an amount that is supportable by the present engine condition. If engine 150 is operating below a maximum power generation configuration, control 162 adjusts the engine operating condition such that engine 150 operates at a condition at or near what is necessary to support the demanded load. Such a construction prevents the overloading of a present engine condition with an excessive auxiliary power output demand during transitions and/or steady state conditions.

Alternative to monitoring the instantaneous condition of the engine during operation, control 162 can be provided with a map which associates engine power parameters with requested auxiliary output power demands. Such a map would allow a specific auxiliary power to be delivered to the auxiliary output only during an associated operating condition of the engine. Such a construction would also allow full utilization of the horsepower range of an engine of any given welding-type power source.

It is equally understood that the present invention is applicable across the entire range of operation of the engine if the system is so equipped. That is, when a relatively large auxiliary load supported by the engine is removed from the apparatus, control 162 will recognize an engine overpower condition and reduce the engine power output such that the engine operates at an engine power parameter sufficient to support any remaining auxiliary load. If engine speed is used to determine the total engine power, when a load is removed from the auxiliary output, control 162 will instruct engine 150 to slow to an engine speed necessary to support a remaining load. Such a construction provides a highly efficient welding-type power source in that the device is not operated at engine speeds greater than the engine speed necessary to support any current power requirements. Alternatively, it is understood to allow the system to return to an idle condition when a load is removed.

It is further understood that the technique shown in FIG. 3 is equally applicable to controlling the welding output based on engine operating condition. That is, by controlling the amount of one or both of the power delivered to the welding output and the power delivered to the auxiliary output, a welding-type device according to the present invention allows the engine thereof to operate at a speed that is no greater than a speed required to support the present load condition of the welding-type device. Accordingly, a device equipped according to the present invention is highly efficient and operates at engine speeds sufficient to support a variety of loading conditions.

Therefore, a technique is disclosed to allow the adjustment of auxiliary outputs of a welding-type apparatus according to the engine operating conditions. The actual engine condition is monitored and compared to the desired engine condition to determine whether the engine is operating at a condition necessary to deliver the desired auxiliary output. As such, the entire range of horsepower capable of being generated by the engine is utilized to support the varied auxiliary load demands.

It is contemplated that the present invention may be utilized with a plurality of welding-type processes and auxiliary outputs. For example, the welding-type apparatus may operate according to a Gas Metal Arc Welding (GMAW) welding-type process, also known as a Metal Inert Gas (MIG) welding-type process, a Tungsten Inert Gas (TIG) welding-type process, a Shielded Metal Arc Welding (SMAW) welding-type process, an induction heating process, a plasma cutting process, an aircraft ground powering process or other such process.

Therefore, the present invention includes a welding-type power source controller that is configured to detect a load on an auxiliary output of a welding-type power source which is configured to supply power to a variable combination of a welding-type output and the auxiliary output. The controller is further configured to monitor an engine operating parameter of the welding-type power source and regulate a power provided to the auxiliary output. The power of the auxiliary output is regulated to an amount of power capable of being generated by the welding-type power source at a current engine condition or reduced power until the engine achieves a desired engine operating parameter as determined by the load detected.

In another embodiment of the present invention, a welding-type power source has an engine driven generator configured to selectively deliver power to a welding-type output and an auxiliary output. The welding-type power source includes an engine speed sensor configured to monitor an engine speed of the engine driven generator and a controller. The controller is configured to receive feedback from the engine speed sensor and adjust power delivered to the auxiliary output in response to engine speed.

An alternate embodiment of the present invention has a method of controlling a welding-type apparatus that includes: sensing an auxiliary load present at an auxiliary output of an engine-driven power source configured to supply power to at least one of a welding-type output and the auxiliary output, sensing a power parameter of the engine-driven power source, comparing the auxiliary load and the power parameter of the engine-driven power source, and adjusting power delivered to the auxiliary output based on the comparison of the auxiliary load and the power parameter of the engine.

In yet a further embodiment of the present invention, a welding-type power source includes means for powering an auxiliary output of a welding-type power source and means for monitoring an engine speed of the welding-type power source. The welding-type power source includes means for controlling the means for powering the auxiliary output in response to the means for monitoring the engine speed to maintain the engine speed at a speed required to generate the required auxiliary output.

The present invention has been described in terms of the preferred embodiment, and it is recognized that equivalents, alternatives, and modifications, aside from those expressly stated, are possible and within the scope of the appending claims.

What is claimed is:

1. A welding power source comprising:
an engine;
a generator driven by the engine to produce power;
power conversion circuitry coupled to the generator and configured to convert the power from the generator to a welding power output and an auxiliary power output; and
control circuitry detecting a desired auxiliary power output, subsequently monitoring an operating parameter of the engine including at least one of a throttle position, an engine speed, and an engine/power map to determine a current engine condition corresponding to the at least one of a throttle position, an engine speed, and an engine/power map, determining a supportable auxiliary power output by reducing the desired auxiliary power output to an amount capable of being supported by the current engine condition, and regulating the auxiliary power output to the supportable auxiliary power output while maintaining the speed of the engine constant at the current engine condition.

2. The welding power source of claim 1, wherein the control circuitry limits the power supplied to the auxiliary power output.

3. The welding power source of claim 1, wherein the control circuitry regulates the power supplied to the auxiliary power output.

4. The welding power source of claim 1, wherein the auxiliary power output is at least one of approximately 110 VAC and approximately 240 VAC.

5. The welding power source of claim 1, wherein the control circuitry regulates the welding power output based on the operating parameter of the engine.

6. The welding power source of claim 5, wherein the control circuitry selectively distributes the power from the generator at the current engine condition between the auxiliary power output and the welding power output.

7. A welding power source comprising:
an engine;
a generator driven by the engine to produce power;
power conversion circuitry coupled to the generator and configured to convert the power from the generator to a welding output and an auxiliary power output;
an engine speed sensor that monitors an engine speed of the engine; and
a controller receiving feedback corresponding to a current engine condition including a current engine speed from the engine speed sensor and adjusting power delivered to the auxiliary power output to a reduced power level supportable by the current engine condition while maintaining the engine speed constant at the current engine speed.

8. The welding power source of claim 7, wherein the auxiliary output delivers an output of at least one of approximately 110 VAC and approximately 240 VAC.

9. The welding power source of claim 7, wherein the generator comprises a first generator that generates the welding output and a second generator that generates the auxiliary output.

10. The welding power source of claim 7, wherein the controller adjusts the auxiliary output to maintain the engine speed at a desired engine speed.

11. The welding power source of claim 10, wherein the desired engine speed extends from approximately idle speed to full speed.

12. A method of controlling a welding power supply comprising:
sensing an auxiliary load present at an auxiliary output of an engine-driven power source, the engine-driven power source comprising an engine and a generator driven by the engine to produce power for a welding output and the auxiliary output;
sensing a power parameter of the engine-driven power source comprising at least one of a throttle position, an engine speed, and an engine/power map;
comparing the auxiliary load and the power parameter of the engine-driven power source;
reducing the auxiliary output to a supportable auxiliary power level based on the comparison of the auxiliary load and the power parameter of the engine-driven power source; and
adjusting power delivered to the auxiliary output to the supportable auxiliary power level while maintaining the speed of the engine-driven power source constant.

13. The method of claim 12, wherein adjusting power delivered to the auxiliary output comprises increasing the power delivered to the auxiliary output to a desired output when the engine can support the auxiliary load as determined by the power parameter of the engine-driven power source.

14. The method of claim 12, wherein adjusting power delivered to the auxiliary output occurs over a range of engine operating speeds.

15. A welding power source comprising:
an engine driven generator comprising an engine and a generator driven by the engine to produce power for a welding output and an auxiliary output;
a first sensor that monitors an engine operating parameter of the engine driven generator comprising at least one of a throttle position, an engine speed, and an engine/power map to determine a current engine condition corresponding to the at least one of a throttle position, an engine speed, and an engine/power map;
a second sensor that monitors an auxiliary power demand present at the auxiliary output of the engine driven generator; and
a controller receiving feedback from the first sensor and the second sensor regarding the current engine condition and the auxiliary power demand and adjusting power delivered to the auxiliary output to a power level supportable by the current engine condition while maintaining the engine speed constant at the current engine condition.

* * * * *